March 10, 1959 — C. M. CHRISMAN — 2,876,924
WEATHER PROOF CONTAINER
Filed Feb. 7, 1957

INVENTOR
C. M. CHRISMAN

United States Patent Office 2,876,924
Patented Mar. 10, 1959

2,876,924
WEATHER PROOF CONTAINER

Charles M. Chrisman, Columbia, Mo.

Application February 7, 1957, Serial No. 638,866

1 Claim. (Cl. 220—8)

This invention relates to the care, storage and handling of materials of various kinds in a manner to protect and preserve them including from the weather or the like, and also relates to equipment by which such care, storage and handling may be easily and simply accomplished.

The invention relates particularly to a receptacle or container the dimensions of which are such that the volume of air contained will be adequate to cause the device to float, as well as a container capable of being used by various craftsmen such as carpenters, plumbers, and the like as tool boxes or by fishermen for containing fishing tackle.

Containers employed for holding fishing tackle, tools for workmen, and the like have been of various kinds and of various materials, however, these have lacked certain desirable characteristics such as the ability to float as well as to exclude water, they have been difficult to open and close; were unwieldy, expensive, and possessed of other undesirable characteristics.

It is an object of the invention to provide a simple inexpensive receptacle or container, of light-weight, of a character which when closed will contain air but exclude water thereby preserving the contents, and which will float when placed in water and thereby preventing the loss of valuable articles or equipment, as well as serving as a life preserver.

Another object of the invention is to provide a single top or cover which may be used with multiple containers or bottoms thereby facilitating the use of a single top with the particular bottom desired.

A further object of the invention is to provide latch means between the container and cover which provides a speedy method of fastening the cover on the container and unfastening the same to permit quick separation one from the other.

Another object of the invention is to provide a closed container with relatively few parts and which can be opened and closed with a minimum of effort.

Figure 1:
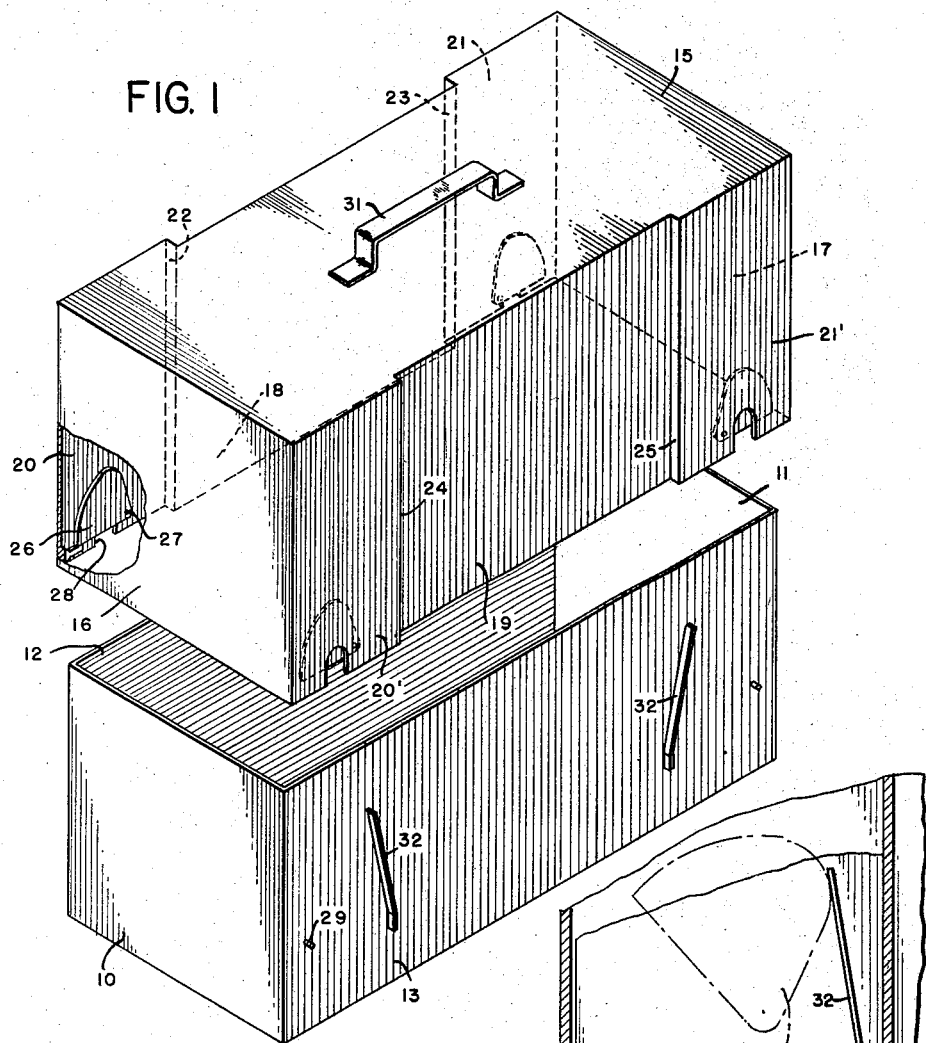
Figure 2:
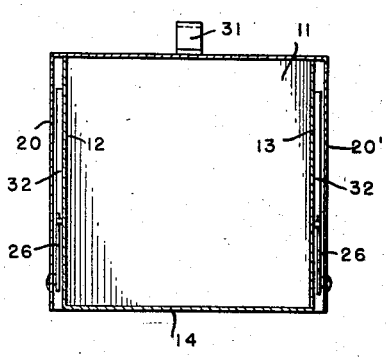
Figure 3:
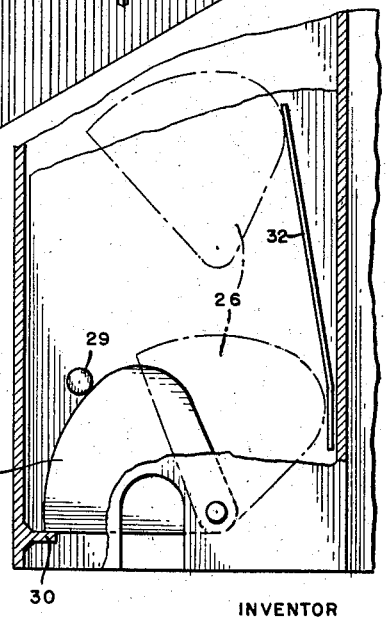

Other objectives and advantages will be apparent from the following description taken in conjunction with the accompanying drawings, wherein:

Fig. 1 is a perspective illustrating one application of the invention;

Fig. 2, a vertical transverse section through the container and cover;

Fig. 3, an enlarged fragmentary detail illustrating the latching or locking mechanism.

Briefly stated, the invention is a weather-proof receptacle and comprises a container and a cover which may be of any desired shape as for example generally rectangular, latching means being preferably provided for fastening the container and cover together and a handle preferably being provided along the center of the top by means of which the top can be removed from the device or the latter can be picked up or transported. The bottom and top, when assembled, provide a chamber containing air so that whether the container is left exposed to the weather its contents will be protected and also because it contains air it will insure the buoyancy of the device so that it will float and preserve the contents from being lost by sinking in a stream or body of water, and also it can be used as a life preserver.

With continued reference to the drawings, the weatherproof container of the present invention comprises end walls 10 and 11, side walls 12 and 13, and a bottom 14, which when assembled provide an open top container of generally rectangular form.

A cover is provided of similar form, and having a top wall 15, end walls 16 and 17 and side walls 18 and 19. The side wall 18 is provided with enlarged wall portions 20 and 21 having shoulders 22 and 23, and the side wall 19 is provided with enlarged wall portions 20' and 21' having similar shoulders 24 and 25. Such enlarged portions provide for the housing of suitable latching mechanism and actuating means therefor.

Automatic latching mechanism is provided for maintaining the bottom and top in assembled relation so that the container will contain air. Such latching mechanism comprises a catch 26 mounted on pivot 27 so that it can swing to a position overlying a slot 28 which is of a size to permit insertion of the finger to move the catch to the dotted line position shown in Fig. 3 to allow the cover to be removed. The catch 26 is adapted to be disposed in the position shown in full lines in Fig. 3 in order to be disposed in latching position beneath a pin 29 fixed near the end of each side of the container so that there are four in number. When the latch 26 is in latching position it rests upon a ledge 30 in the cover and when the parts are locked together the container may be picked up by a handle 31.

In assembling the container and cover, the handle 31 is grasped and the cover placed upon the container, the catches having first been disposed in the position shown in full lines in Fig. 3. As the cover is applied, the catches will be engaged by the pins 29 and such catches will pivot sufficiently to permit them to drop beneath the said pins. When the cover is placed on the container if one or more of the latches happen to be in the dotted line position of Fig. 3 they will engage the cam strips 32 originally attached to the side walls 12 and 13 of the container as illustrated in Figs. 1 and 2, and said latches will be tripped to the full line position of Fig. 3 so that they latch as stated.

It will be apparent from the foregoing that a relatively simple and inexpensive container is provided which may be used for fishing tackle, carpenters', plumbers, electricians, or other types of tools or equipment which will protect the contents from the weather regardless of whether left indoors or outdoors; which will float and serve as a lift preserver; which can be readily used for storage, transportation and the like; and can be readily opened and closed and the parts automatically retained in closed position.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

A receptacle of the character described comprising a generally rectangular container and a separable cooperative cover, said container having a bottom and generally upright walls, said cover having a top depending walls adapted to overlie and cooperate with said container, said upright walls and said depending walls being substantially the same height, said cover having enlargements at each side adjacent each end wall, gravity operated latching mechanism in each of said enlargements, said latching mechanism comprising a generally triangular latch pivotally mounted at one apex to said enlargement for movement in a plane parallel to the side walls, the side of said latch opposite said pivot being radial with said pivot, the lower side of said latch in locked normal operative position being spaced from and parallel to the bottom of said cover, a ledge extending from the end of said enlargement and forming a stop to restrict downward movement of said latch, a projection mounted on the outer surface of said container in spaced relation to the bottom and end of the container and lying in the path of the latch during movement of the cover to closed position, said projection being above the latch when the cover is in closed position and the latch is in normal operative position, means for moving latch to inoperative position, a latch resetting cam attached to said container, said cam having its lower surface spaced less than the height of said latch from said pivot and its upper surface inclined toward the end of said container a distance sufficient to cause said latch to fall by gravity.

References Cited in the file of this patent

UNITED STATES PATENTS

| | | |
|---|---|---|
| 287,473 | Reetz | Oct. 30, 1883 |
| 340,567 | French | Apr. 27, 1886 |
| 664,043 | Holman | Dec. 18, 1900 |
| 1,632,243 | Myers | June 14, 1927 |